3,318,805
RECOVERY OF FRESH WATER FROM BRINE
Howard V. Hess, Glenham, and Frank E. Guptill, Jr., Fishkill, N.Y., assignors to Texaco Inc., New York, N.Y., a corporation of Delaware
Filed Nov. 16, 1964, Ser. No. 411,352
11 Claims. (Cl. 210—21)

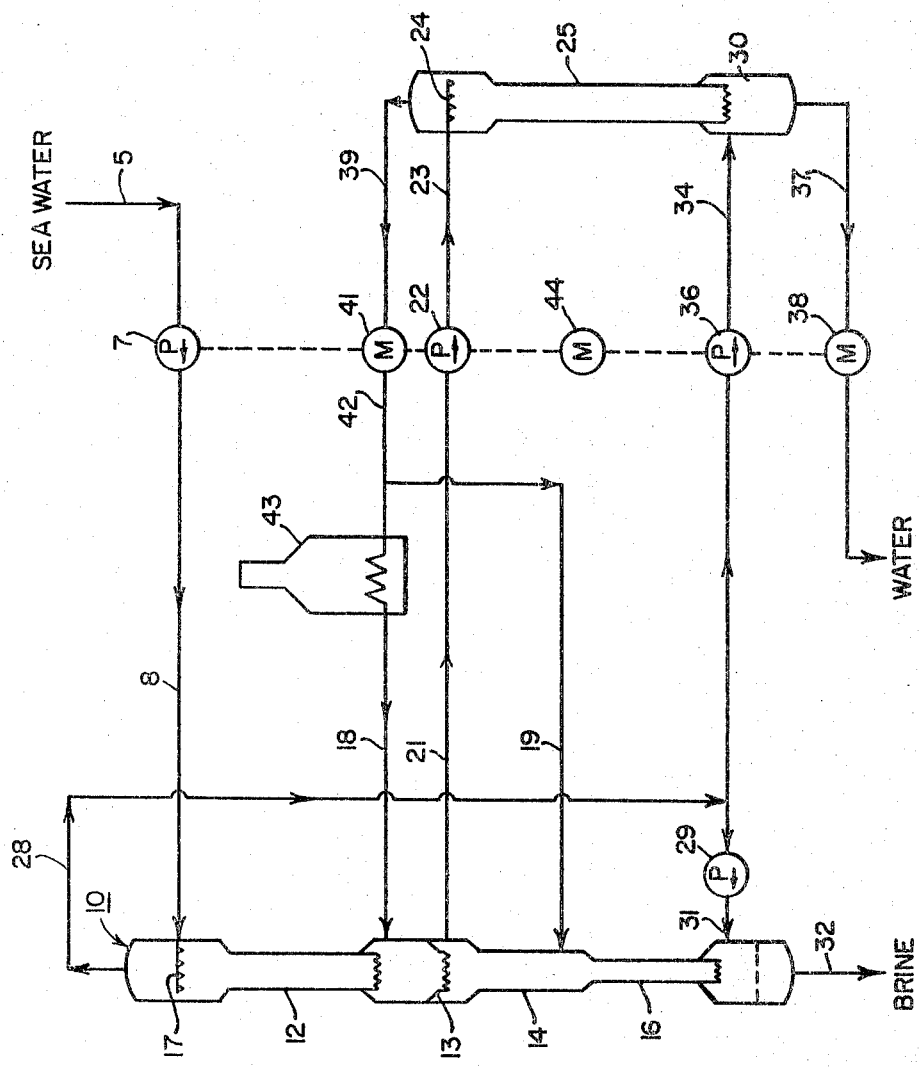

The present invention relates to a novel process and apparatus for separating fresh water from brine. The process is applicable to the rocovery of salt-free water from brines and to the concentration of various brines for the recovery of soluble salts contained therein.

In one of its more specific aspects, the present invention is concerned with a process for separating water from a salt solution or brine by extraction of the water with an organic liquid characterized by the property of extracting a greater amount of water at an elevated temperature and pressure than at a lower temperature and having the property of releasing water from the extract as the pressure is increased above the extraction pressure. In carrying out the process of this invention, the organic liquid is brought into contact with the brine at an elevated temperature and pressure, e.g. 500–600° F. and 1000–2000 p.s.i.g. to extract water from the brine and form a complex comprising water and said organic liquid substantially free from inorganic salts. Water is recovered from the complex by subjecting the complex to increased pressure at the temperature of the extraction step or at a lower temperature. The complex which may be in liquid phase or dense vapor phase at the elevated pressure, usually above about 1000 p.s.i.g., is immiscible with the residual brine and is separated from the brine by gravity. After separation of the complex from the residual brine, the complex is resolved by increasing the pressure sufficiently above the extraction pressure to cause the organic liquid and water to separate from one another as two immiscible liquid phases. It is not necessary to change the temperature of the extract to liberate water from the organic liquid. The separated water, the residual brine, or salts liberated from the brine may be recovered as products of the process while the organic liquid may be recycled to the extraction step.

The term "brine" is used in a broad sense to denote the entire range of concentrations of water soluble inorganic salts in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfate of sodium, potassium, lithium, calcium, magnesium, zinc and copper.

Hydrocarbon liquids are preferred as the organic liquid employed for the extraction of water from brines by the process of this invention. Other organic liquids which may be used in the process include high molecular weight hydrocrabon derivatives, for example, alcohols, ketones and ethers containing from 8 to 12 atoms per molecule.

The term "complex" is used herein to designate the solution of water in the organic liquid or mixed vapors separated from the residual brine in the extraction zone in the process of this invention.

For greatest efficiency, the extraction step of the present process should be operated at a temperature above 500° F. and at a pressure within the range of 1000 to 2000 p.s.i.g. sufficient to maintain the brine in liquid phase at the operating temperature. In the extraction step, the complex and the residual brine form two immiscible fluid phases, the brine forming the more dense liquid phase, and the complex, a less dense fluid phase which may be liquid or dense vapor. After separating the complex from the brine, water may be separated from the complex by reducing the temperature of the complex below the extraction temperature as disclosed in the copending U.S. patent application of Howard V. Hess, Ser. No. 144,240, filed Oct. 10, 1961, now abandoned. Resolution of the complex by temperature reduction usually requires cooling the complex to a temperature well below extraction temperature to break out the major part of the water from the complex. Only part of this heat may be recovered and this at the expense of large heat exchange installations. In the process disclosed herein, separation of water from the complex may be accomplished at the extraction temperature but at a pressure substantially above the extraction pressure. Advantageously, the complex is subjected to a pressure at least 500 p.s.i. above the extraction pressure. To assure liberation of a major part of the water contained in the complex somewhat greater efficiency is usually obtained if the pressure is increased by as much as 1000 p.s.i. above the extraction pressure. Part of the power required to increase the pressure of the complex to the higher pressure is recovered by a suitable fluid actuated motor or turbine.

By way of illustration, cumene has the property of extracting about 47 weight percent water at 2000 p.s.i.g. and 625° F., 28.5 weight percent at 2500 p.s.i.g., and about 18 weight percent at 3000 p.s.i.g. Consequently, with the extraction step of the process operating at 625° F. and 2000 p.s.i.g. and with the complex resolution or water recovery step operating at 625° F. and 3000 p.s.i.g., there is a recovery of water in the amount equivalent to about 29 percent of the weight of the cumene.

The operating temperature is preferably kept above 550° F. and preferably above 600° F. The upper temperature limit should be below that at which the decomposition of the organic liquid might occur at the pressure under other conditions of the system, e.g., the presence of water vapor and salts. The temperature and pressure must be coordinated so that the operating pressure is in excess of the vapor pressure of the brine in the extraction step and above the vapor pressure of the water in the water recovery step at the temperature conditions of these steps. In the present process, the temperature at which the complex is resolved and the water separated from the organic liquid is essentially the same temperature as that in the extracting step. It is to be understood however, that in some cases the extraction may be carried out efficiently at a temperature somewhat higher than the temperatures in the phase separation step.

Normally liquid hydrocarbons are generally suitable for use in the process of this invention. Hydrocarbons and mixtures of hydrocarbons containing from 6 to 30 carbon atoms per molecule are useful in the process. Hydrocarbon liquids of 6 to 12 carbon atoms per molecule are preferred. Various petroleum fractions, including kerosene; naphtha; odorless spirits; gasoline; lubricating oils; "alkylation bottoms," i.e., the bottoms fraction obtained from the alkylation of butylenes with isobutane; $C_9$–$C_{10}$ aromatic hydrocarbons, e.g., aromatic hydrocarbons obtained by alkylation of benzene or toluene with propylene; and Udex extract, i.e. an aromatic hydrocarbon fraction obtained from petroleum naphtha by extraction with diethylene glycol containing water may be used in the process. Examples of individual hydrocarbon types which can be used in the process, either alone or in admixture with one another, are the aliphatic hydrocarbons, including hexane, 2,3-dimethylbutane, heptanes, octanes, isooctane, nonanes, decanes, propylene tetramer, hexadecane, 2-methyl-1-pentene, etc.; alicyclic hydrocarbons, e.g., methylcyclopentane, cyclohexane, methylcyclohexane, dimethylcyclohexane, ethylcyclohexane, tetralin, isopropylcyclohexane, cyclohexane, pinene, etc.; and aromatic hydrocarbons, e.g., benzene, toluene, cumene, xylenes, methylnaphthalenes, etc.

The preferred organic liquids are those which are stable under the temperature and pressure conditions employed in the process, for example, 550° F. to 650° F. and 1000 to 3000 p.s.i.g. If the water is to be used for domestic purposes, the organic liquid employed should have low toxicity and low solubility in water at ordinary temperatures and atmospheric pressure. In general, the aromatic hydrocarbons are preferred for concentration of brines for salt recovery and the saturated hydrocarbons are preferred for the production of potable water.

The figure illustrates diagrammatically an arrangement of apparatus suitable for carrying out the process of this invention for the recovery of fresh water from sea water.

With reference to the figure, an efficient plant for the extraction of fresh water from brine is illustrated as a specific example. The temperatures and pressures referred to in the following detailed description of the drawing are for the purpose of illustrating the specific example. In this example, cumene is the organic liquid and sea water containing 3.5 percent salt by weight is processed to yield salt-free water for industrial use at the rate of 10,000 gallons per day.

In this example, sea water is supplied to the plant through line 5 at 70° F. at the rate of 4,365 pounds per hour. Pump 7 raises the pressure of the water to the operating pressure of the extraction step, in this example 2000 p.s.i.g., and delivers the sea water through line 8 to the upper part of a long vertical cylindrical pressure vessel 10. Vessel 10 comprises a series of vertically arranged superimposed countercurrent contacting columns comprising a brine heater 12 in the upper part of column, an extractor 14 at its mid section and a brine cooler 16 in its lower portion. A trap tray 13, preferably provided with a central downcomer separates preheater 12 from extractor 14. The diameter of vessel 10 may vary with the different sections depending upon the volumes of fluid handled in each section. For example, the volumes of the liquids passing through the brine cooler 16 are substantially less than the volumes in preheater 12, so that the column diameter of cooler 16 need not be nearly as large as that of the preheater 12.

Brine enters vessel 10 near its top through a suitable distributor or sparger 17 which disperses the brine in the hydrocarbon liquid. In operation, brine heater 12 is maintained full of liquid with the hydrocarbon liquid as the continuous phase and with the brine as the discontinuous phase. The hot hydrocarbon liquid may be introduced to vessel 10 at one or more points. In this particular example, the hydrocarbon is supplied at two levels in the column, one stream entering the lower part of preheater 12 and the other entering the lower part of extractor 14. All of the hydrocarbon required for the brine preheating and extraction steps can be introduced to the vessel at either point without affecting the operation of the process. In this example, cumene at 645° F. is supplied at the rate of 7,530 pounds per hour, together with 3,231 pounds per hour of water, to the lower part of brine heater 12 through line 18. The sea water or brine entering the top of heater 12 flows down through the column countercurrent to and in direct contact with the hydrocarbon liquid flowing upwardly through the column. The sea water is heated to a temperature of 625° F. in heater 12 while the cumene is cooled to a temperature of 90° F. Direct heating of the brine in heater 12 almost entirely eliminates the problems of scale deposition and metal corresion encountered with indirect heaters.

The operation is carried out with vessel 10 substantially completely filled with liquid with the hydrocarbon as the continuous phase and brine as the discontinuous phase. The brine level normally is restricted to a small portion of the lower end of vessel 10 just sufficient to insure that brine substantially free from hydrocarbon may be withdrawn from the bottom of the vessel. The hydrocarbon liquid wets the walls of the vessel and protects them from direct contact with the brine.

In the arrangement illustrated in the drawing, each section of vessel 10, or each individual column comprising the vessel, terminates at its lower end at a point below the top of the next succeeding lower section or column. This arrangement insures hydrocarbon flow along the walls of the columns and wetting the walls with the hydrocarbon liquid. It is preferable to provide serrations at the lower ends of columns 12 and 16 and at the lowermost part of trap tray 13, as illustrated in the drawing, to provide substantially uniform distribution of hydrocarbon around the circumference of each column.

Hot brine leaves the brine heater 12 at about 625° F. and flows down through trap tray 13 into extractor 14 where it is contacted with hot cumene from line 19 at 626° F. entering the lower part of extractor 14 at the rate of 12,109 pounds per hour together with 5,190 pounds per hour of water. The trap tray 13 permits withdrawal of the complex from extractor 14 substantially free from residual brine. The complex, which is immiscible with the brine and has a lower specific gravity than the brine, accumulates in the annular chamber surrounding the downcomer of trap tray 13 whereas the brine flows down through the downcomer. The brine, having a higher specific gravity than the complex, continues its flow down through column 14 where water is extracted from the preheated brine by the hot cumene introduced through line 19. The resulting complex, comprising 13,299 pounds per hour of cumene and 11,888 pounds per hour of water, is withdrawn from the upper part of extractor 14 through line 21 by pump 22. Pump 22 raises the pressure of the complex to 3000 p.s.i.g. and delivers it through line 23 to a distributor 24 in the upper end of column 25 comprising a pressure vessel and described hereinafter.

Cumene at 90° F. is drawn from the top of vessel 10 through line 28 at the rate of 7,530 pounds per hour. Pump 29 returns part of this cumene through line 31 to the pressure vessel at the lower end of brine cooler 16 at the rate of 1,190 pounds per hour to recover heat from the residual brine. Residual brine from extractor 14 flows down through brine cooler 16 where it is brought into direct countercurrent contact with upwardly flowing hydrocarbon liquid, i.e. cumene, introduced at 90° F. into the lower part of cooler 16 through line 31. Residual brine is cooled to about 200° F. in brine cooler 16 and is discharged from the lower end of vessel 10 through line 32 at the rate of 898 pounds per hour. The residual brine comprises 745 pounds per hour of water and 153 pounds per hour of salt.

The complex introduced into vessel 25 through line 23 separates into a water phase and a hydrocarbon rich phase. Water liberated from the complex flows downwardly through vessel 25 countercurrent to the flow of cumene introduced through line 34 at 90° F. and 3000 p.s.i.g. into the lower end of vessel 30 by pump 36 at the rate of 6,340 pounds per hour. The water is cooled to 110° F. by direct countercurrent contact with the hydrocarbon and is discharged from the lower end of vessel 25 through line 37 to turbine 38 at the rate of 3,467 pounds per hour. The pressure of the water is reduced to atmospheric in the turbine producing power to help drive pumps 7, 22 and 36.

Hydrocarbon liquid containing some water is discharged from the upper end of vessel 25 through line 39 to turbine 41 at the rate of 19,639 pounds per hour of cumene, together with 8,421 pounds per hour of water. In turbine 41, the pressure of the cumene is reduced to 2000 p.s.i.g., generating power utilized for driving pumps 7, 22 and 36. From turbine 41 the hydrocarbon (containing water) is discharged at 626° F. into line 42. Part of the hydrocarbon is passed through heater 43, at the rate of 7,530 pounds per hour of cumene and 3,231 pounds per hour of water, where its temperature is raised from 626° F. to 645° F. The heated hydrocarbon from heater 43 flows through line 18 to preheater 12. The remainder of the hydrocarbon and water from line 42 flows through line 19 at the rate of 12,109 pounds per hour of cumene and 5,190 pounds per hour of water to extractor 14. An electric motor 44 supplements the power available from turbines 38 and 41 to drive pumps 7, 22 and 36.

Residual cumene contained in the fresh water product may be eliminated therefrom by passing the water through a suitable purifying filter, e.g., a filter containing activated charcoal.

While the process has been described herein with reference to recovery of salt-free water from brine as the primary objective, it is to be understood that the process is applicable also to the recovery of salts from brine or for the concentration of brines, per se. Concentrated brine, either saturated or unsaturated, may be produced as a product of the process, or crystallization of salts from the brine may be carried out in the extractor. The salt crystals may be withdrawn, with or without cooling, from the extractor. Mother liquor withdrawn with the crystals may be separated from the crystals and returned to the system.

We claim:

1. A process for extracting water from brine which comprises contacting brine at an elevated temperature above about 500° F. and at a pressure sufficient to maintain resulting residual brine in liquid phase at said elevated temperature with an immiscible organic liquid characterized by the ability to extract salt-free water from brine at said elevated temperature and pressure and by the ability to liberate said extracted water at a higher pressure, removing resulting extract consisting essentially of relatively salt-free water in said organic liquid from contact with residual brine containing an increased salt concentration, subjecting said extract to a pressure above said first mentioned pressure effecting liberation of relatively salt-free water from said extract as a separate liquid phase, and withdrawing said water phase from the resulting organic liquid phase.

2. A process as defined in claim 1 wherein said organic liquid is a hydrocarbon liquid.

3. A process as defined in claim 1 wherein said separation of said water phase from said extract is effected at substantially said elevated temperature and at a pressure sufficient to maintain said water phase in liquid state.

4. A process according to claim 1 wherein said brine is preheated to a temperature approximating said elevated extraction temperature by direct countercurrent contact with said organic liquid preheated to a temperature approximating said elevated extraction temperature.

5. A process as defined in claim 1 in which said resulting organic liquid phase remaining after separation of said water phase is subjected to pressure reduction to said first mentioned pressure and contacted with additional brine for removal of water therefrom.

6. A process as defined in claim 1 wherein said residual brine is passed in direct countercurrent heat exchange with a relatively cool stream of said organic liquid whereby said organic liquid is heated to substantially said elevated temperature and said residual brine cooled.

7. A process as defined in claim 1 wherein water separated from said extract at said higher pressure is passed in direct countercurrent contact with a relatively cool stream of said organic liquid liberated from said extract whereby the water is cooled and the organic liquid heated, and passing resulting heated organic liquid in admixture with said resulting organic liquid phase resulting from said water separation into contact with hot brine for extraction of water therefrom.

8. A process according to claim 1 wherein said organic liquid is a hydrocarbon liquid consisting essentially o hydrocarbons of 8 to 12 carbon atoms per molecule.

9. A process according to claim 1 wherein said brin is contacted with said organic liquid to effect water ex traction at a pressure in the range of 1000 to 2000 p.s.i.g and said water phase is separated from said extract at a pressure at least 500 p.s.i. higher than the pressure in the extraction step and within the range of 2000 to 3000 p.s.i.g 10. A process for extracting water from brine whic comprises passing relatively cool brine into direct counter current contact with relatively hot hydrocarbon liquid ir a first contacting zone wherein said brine is heated to ar elevated temperature and said hydrocarbon is cooled undei sufficient pressure to maintain said brine and said hydrocarbon in liquid phase; passing preheated brine from said first contacting zone into admixture with hydrocarbon liquid at a temperature above about 500° F. thereby extracting water from said brine into said hydrocarbon and forming a complex consisting essentially of relatively salt-free water in said hydrocarbon under sufficient pressure to maintain the resulting residual brine in liquid phase; withdrawing said extract from said residual brine containing an increased salt concentration and increasing the pressure of said extract by an amount sufficient to liberate water from said extract as a separate water phase; and withdrawing water liberated from said extract as a product of the process.

11. A process for extracting water from brine comprising passing relatively cool brine into direct countercurrent contact with hydrocarbon liquid at a temperature above about 500° F. in a first contacting zone wherein said brine is heated to an elevated temperature and said hydrocarbon is cooled to a temperature near the temperature of the inlet brine under sufficient pressure to maintain said brine and said hydrocarbon in liquid phase; passing resulting preheated brine from said first contacting zone to an extraction zone wherein said preheated brine is contacted with hot hydrocarbon liquid at a temperature above about 500° F. under sufficient pressure to maintain resulting residual brine in liquid phase forming an extract consisting essentially of substantially salt-free water in hydrocarbon and forming a residual brine containing an increased salt concentration; withdrawing resulting extract from said extraction zone and subjecting said extract to an elevated pressure at least 500 p.s.i.g. higher than said first mentioned pressure without substantial change in temperature thereby liberating water from said extract as a separate water phase; passing said liberated water in a second contacting zone into direct countercurrent contact with cool hydrocarbon liquid from said first contacting zone whereby said water is cooled and said hydrocarbon liquid is heated; combining said heated hydrocarbon liquid from said second contacting zone with resulting hydrocarbon rich phase from said extract and passing the mixture into contact with said brine with sufficient heating to make up for heat losses in the system; passing said residual brine in a third contacting zone into direct countercurrent contact with cool hydrocarbon liquid withdrawn from said first contacting zone whereby said residual brine is cooled and said hydrocarbon liquid heated; and passing resulting heated hydrocarbon liquid into contact with brine in said extraction zone.

References Cited by the Examiner

UNITED STATES PATENTS

| | | | |
|---|---|---|---|
| 965,148 | 7/1910 | Angell | 210—56 |
| 2,298,791 | 10/1942 | Harrington | 208—311 |

OTHER REFERENCES

Saline Water Conversion Report for 1964, United States Department of the Interior. Office of Saline Water, pages 206–210 relied upon.

MORRIS O. WOLK, *Primary Examiner.*

E. G. WHITBY, *Assistant Examiner.*

UNITED STATES PATENT OFFICE
CERTIFICATE OF CORRECTION

Patent No. 3,318,805     May 9, 1967

Howard V. Hess et al.

It is hereby certified that error appears in the above numbered patent requiring correction and that the said Letters Patent should read as corrected below.

Column 1, line 59, after "12" insert -- carbon --.

Signed and sealed this 21st day of November 1967.

(SEAL)
Attest:

Edward M. Fletcher, Jr.
Attesting Officer

EDWARD J. BRENNER
Commissioner of Patents